United States Patent [19]

von Allwörden

[11] 4,149,736

[45] Apr. 17, 1979

[54] THREE POINT LINKAGE

[75] Inventor: Wilhelm von Allwörden, Erbach, Fed. Rep. of Germany

[73] Assignee: Jean Walterscheid GmbH, Lohmar, Fed. Rep. of Germany

[21] Appl. No.: 819,606

[22] Filed: Jul. 27, 1977

[30] Foreign Application Priority Data

Aug. 26, 1976 [DE] Fed. Rep. of Germany ....... 2638432

[51] Int. Cl.² .............................................. B60D 1/16
[52] U.S. Cl. ................................ 280/461 A; 280/477; 280/482
[58] Field of Search .......... 280/460 A, 461 A, 478 R, 280/478 A, 479 R, 482, 477; 172/272, 439, 450

[56] References Cited

U.S. PATENT DOCUMENTS

| 3,157,416 | 11/1964 | Sandbakken | 280/482 X |
| 3,404,901 | 10/1968 | Rau | 280/482 X |
| 3,791,456 | 2/1974 | Geisthoff | 280/460 A X |
| 3,889,980 | 6/1975 | Geisthoff | 280/461 A |

Primary Examiner—Joseph F. Peters, Jr.
Assistant Examiner—R. Schrecengost
Attorney, Agent, or Firm—Toren, McGeady and Stanger

[57] ABSTRACT

A three point linkage for attaching a working machine to a vehicle includes two lower guide members, a substantially U-shaped coupling frame pivotally connected at its ends with the lower guide members, and an upper guide member supported by tension springs from the U-shaped coupling frame. A length adjusting device is carried by the upper guide member for longitudinally varying its length. The upper guide member can be secured in various adjusted length positions. A link is connected between the coupling frame and the length adjusting device for actuating the adjusting device to vary the length of the upper guide member upon the application of pressure to the coupling frame. A catch hook for connection to the working machine is carried at one end of the upper guide member and the hook can be locked and unlocked by movement of the coupling frame.

6 Claims, 6 Drawing Figures

THREE POINT LINKAGE

BACKGROUND OF THE INVENTION

The present invention relates generally to a coupling arrangement for attaching a working tool or machine or a similar device, such as farm equipment, to a vehicle, such as an agricultural tractor. More particularly, the invention is directed to such a coupling of the three point linkage type having two lower guide members, a substantially U-shaped coupling frame pivotally connected to each of the lower guide members and an upper guide member supported from the U-shaped coupling frame by tension springs, the upper guide member is adjustable to vary its longitudinal length and can be immobilized in various longitudinally extended positions.

Three point linkage couplings for attaching working machines to vehicles such as tractors are generally well known in the art and typically include coupling means at one end for attachment to the vehicle or tractor and releasable attaching devices, such as catch hooks carried on the other end for releasable connection to the working machine. Three point linkages of this type having a coupling frame articulated to the lower guide members and from which the upper guide member is suspended by means of tension springs are also known as disclosed in U.S. Pat. No. 3,791,456. Such prior arrangements, however, merely employ the coupling frame as a means for supporting the upper guide member with respect to the lower guide members so that the upper guide member can be moved up and down jointly with the lower guide members. The task of manipulating the upper and lower guide members into a proper position for connection with the working machine is still a difficult operation even when using the three point linkages which have U-shaped frames for coupling the lower guide members with the upper guide member.

It is accordingly the principle object of the present invention to provide a three point linkage which will facilitate and simplify the operations and maneuvers required for coupling and uncoupling a working machine with a vehicle such as a farm tractor.

A more specific object of the present invention is to provide a three point linkage having an upper guide member the length of which can be automatically adjusted upon approach of the vehicle to the working machine by using the coupling frame, and to provide a means for automatically operating a locking device for a catch hook carried by the upper guide member, in response to vertical movement of the lower guide members.

Other objects, features and advantages, along with the foregoing objects of the present invention will become more apparent from the description of the invention in conjunction with the accompanying drawings to be described more fully hereinafter.

SUMMARY OF THE INVENTION

The foregoing and other objects of the present invention are generally accomplished by providing a three point linkage for attaching a working machine to a vehicle which has two lower guide members and an upper guide member with an inverted substantially U-shaped coupling frame pivotally connected to each of the lower guide members. The upper guide member is suspended from the inverted U-shaped coupling frame by tension springs, and length adjusting means longitudinally vary the length of the upper guide member. A link is connected between the length adjusting means and the U-shaped coupling frame to transmit the pressure applied on the coupling frame to the length adjusting means for actuating the adjusting means. Further, the releasable catch hook carried by the upper guide member is provided with a locking mechanism which can be engaged by the coupling frame to unlock the catch hook for release of the working machine when the lower guide members are dropped or moved in a vertically downward direction.

By using the coupling frame to automatically operate the length adjusting means and the locking device for the catch hook, the operations and maneuvers for coupling and uncoupling the vehicle to the working machine are greatly facilitated. Such maneuvers can be accomplished by the driver of the tractor from his driving position without requiring the assistance of a helper. Additionally, as a result of the present invention it is no longer necessary to align the upper guide member of the three point linkage precisely with a coupling point or coupling bolt carried on the working machine. In the past, such alignment has been extremely difficult to achieve, since such coupling points or bolts are not readily visible by the driver of the tractor when he is in his driving position. Precise alignment of the upper guide member with a coupling point on the working machine is no longer necessary when using the present invention because of the linkage connected between the coupling frame and the length adjusting means carried by the upper coupling member. When the tractor is moved backwards toward the working machine, the closed end or bridge portion of the coupling member will engage an upper part of the working machine and, as a result of the backward movement of the tractor, pressure will be applied to the coupling frame which is transmitted via the link to the length adjusting means so that the longitudinal length of the upper guide member can be appropriately adjusted as the tractor continues to move in the reverse direction toward the working machine. Accordingly, extension of the upper coupling member will be accomplished automatically.

A further feature of the present invention provides for a cable or traction line to be connected to the coupling frame for manual preselection of a desired length of the upper guide member.

Release of the length adjusting means for the upper guide member can be obtained either by direct action of the coupling frame on a releasing nut or sleeve, through the use of the intermediate linkage, or by means of a releasing lever acting directly on the nut or sleeve, or by any other suitable actuating mechanism.

Preferred examples of the present invention are hereinafter more specifically described with reference to the accompanying drawings annexed hereto.

DESCRIPTION OF THE INVENTION

Figure 1:
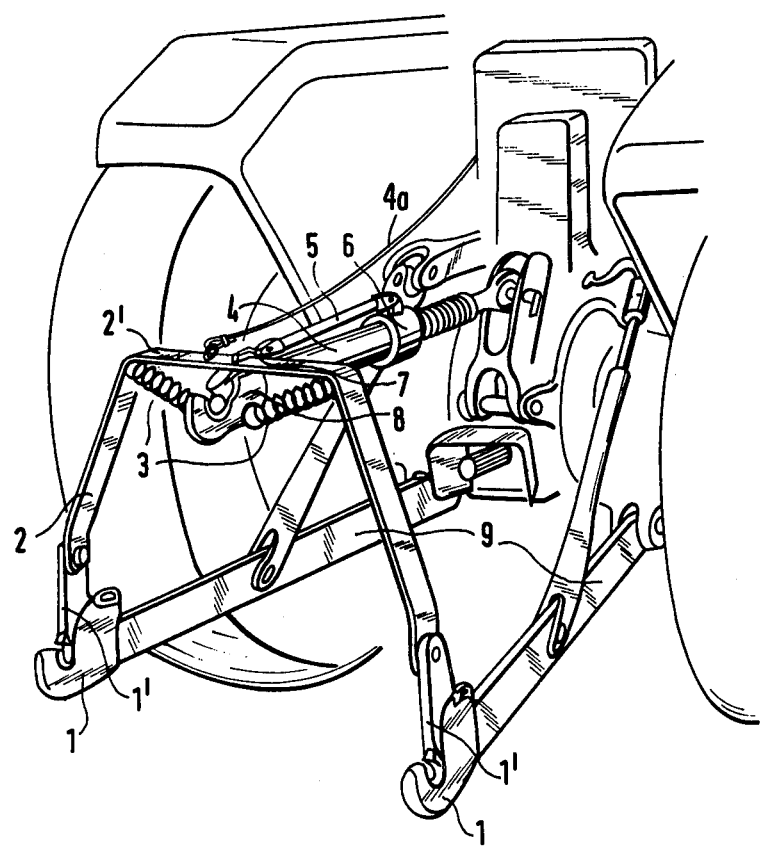
FIG. 1 is a rear perspective view illustrating the rear portion of a tractor with the three point linkage coupling according to the present invention coupled therewith.

Referring now in more detail to the accompanying drawings, the three point linkage includes two lower guide members 9 pivotally coupled at one end to the tractor or vehicle and having lower catch hooks 1 at the other end. An upper guide member 4 is also pivotally coupled to the tractor or vehicle and has a releasable catch hook 8 at its other end for connection to the working machine to be attached to the tractor.

A coupling frame 2 in the form of an inverted substantially U-shaped frame is pivotally connected with the lower catch hooks 1 of the lower guide members 9. Tension springs 3 are connected to the coupling frame at the upper or closed end thereof and support the upper guide member 4 beneath its closed end or bridge member 2'. For this purpose, the tension springs 3 are also connected to the catch hook 8 of the upper guide member.

The upper guide member 4 carries a length adjusting mechanism 6, to be described more fully hereinafter, for varying the longitudinal or axial length of the upper guide member to facilitate attachment to the working machine. As will be appreciated hereinafter, actuation of the length adjusting mechanism is accomplished by application of force thereto. In order to automatically apply this force to the length adjusting mechanism, a link 5 is connected at one end thereof to the bridge member 2' of the inverted U-shaped coupling frame 2, and at the other end thereof with the length adjusting mechanism. In this manner, when pressure is applied to the coupling frame as a result of engaging the working machine when moving the tractor in a backward direction, appropriate forces can be transmitted through the link 5 to the length adjusting mechanism 6 for actuating the length adjusting mechanism to vary the length of the upper guide member.

The operation of coupling a working machine to the tractor requires that the tractor be driven backwards so that the three point linkage coupling carried on the end of the tractor will approach the working machine. The bridge member 2' of the coupling frame 2 will first engage an upper part of a typical three point attachment mast (not shown herein) carried on the working machine. As the tractor continues to move in a rearward direction, the coupling frame 2 will be caused to pivot about its connections with the lower catch hooks so that the bridge member 2' will be moved toward the tractor. The link 5 is supported on the bridge member 2' by a linkage suspension 7 so that as the bridge member 2' is moved toward the tractor the forces applied to the bridge member will be transmitted via the linkage suspension 7 and link 5 to the length adjusting mechanism 6 so as to cause this mechanism to be released or opened. As a result, the upper guide member 4 (which includes telescopically cooperating elements) will telescopically contract until the lower guide members are moved into such a position that coupling bolts carried by the working machine engage the cooperating engagement faces 1' on the lower catch hooks 1 of the lower guide members 9.

When the lower guide members are raised, the coupling frame 2 will cause the catch hook 8 of the upper guide member 4 to be coupled, against the action of the tension springs 3, with an upper coupling bolt of the working machine.

Figure 2:
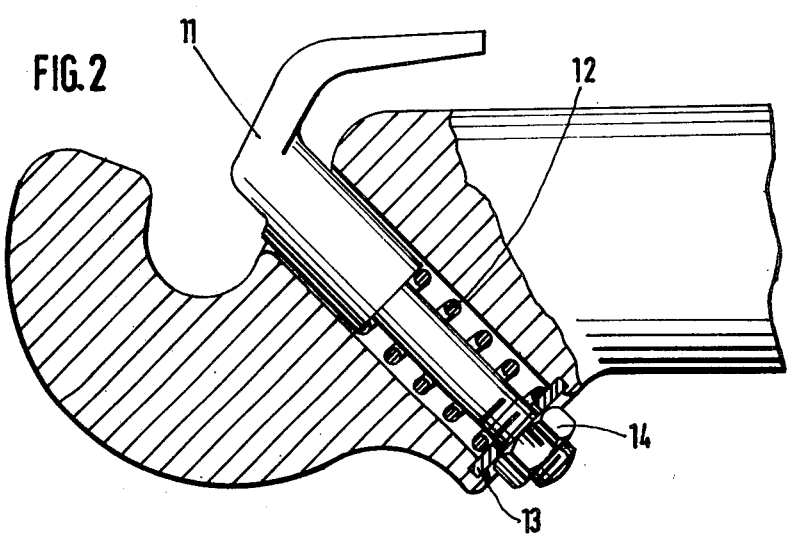
FIG. 2 is a partial sectional view illustrating the catch hook carried on the upper guide member with releasable locking means actuatable by the coupling frame.

The catch hook 8 on the upper guide member carries an automatic locking mechanism, shown and appreciated more fully from FIG. 2. The locking mechanism for the catch hook 8 includes a locking bolt 11 which is urged into a locking position by a compression spring 12 supported by a washer 13 and nut 14 acting as counterbearings. The locking bolt 11 carries an L-shaped extension which can be engaged by the bottom surface of the bridge member 2' of the coupling frame. When the bridge member of the coupling frame is moved backward as a result of engagement with the working machine, it will engage the L-shaped extension of the locking bolt 11 causing it to be depressed against the action of the compression spring 12 so as to open the mouth of the catch hook 8. After the catch hook 8 is coupled with a coupling bolt on the working machine the bridge member 2' will be released from the L-shaped extension of the locking bolt, so that the locking bolt 11 will extend into the mouth of the catch hook 8 to the locking position.

Once the catch hook 8 of the upper guide member is appropriately coupled and locked with a coupling bolt on the working machine, the lower guide members will be lifted about their pivotal connection with the tractor so as to engage and be coupled with lower coupling bolts on the working machine.

In order to disconnect or uncouple the working machine from the tractor, the catch hooks on the lower guide members, which also have locking mechanisms not shown herein, will be opened by the use of appropriate traction lines and the lower guide members 9 will be allowed to drop away from the coupling bolts of the working machine. As a result, the weight of the coupling frame 2 will bring it downward and the bridge member 2' will engage the L-shaped extension of the locking bolt 11 in the upper catch hook 8 pushing it against the compression spring 12 thus opening the mouth of the catch hook 8 and releasing it from the coupling bolt of the working machine.

Figure 3:
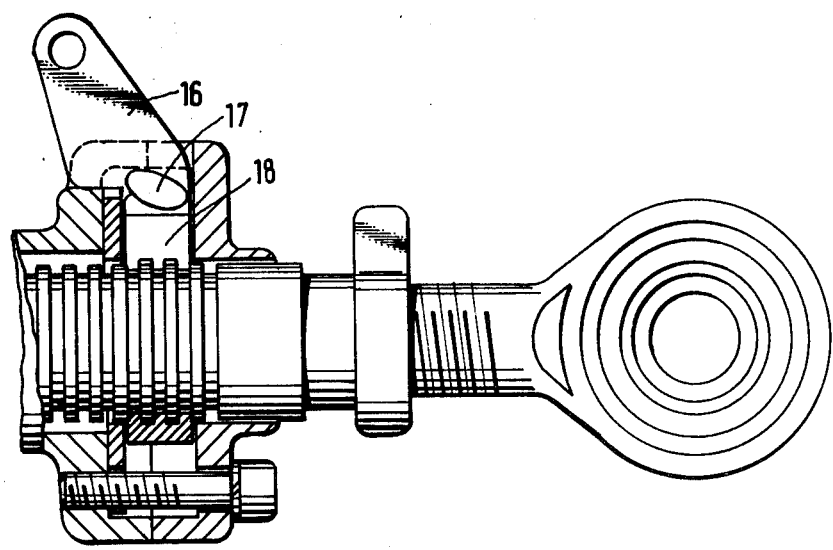
FIG. 3 is a partial sectional view illustrating the length adjusting mechanism for the upper guide member in accordance with the present invention.
Figure 4:
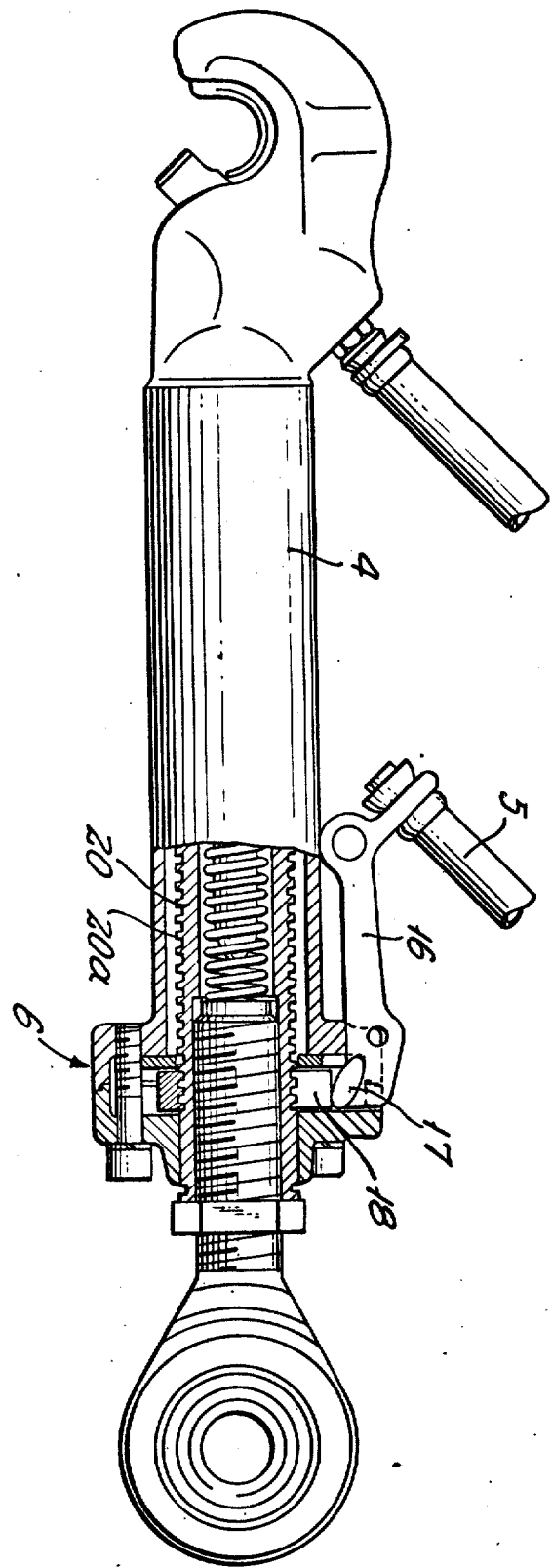
FIG. 4 is a side view partly in section illustrating an embodiment of the length adjusting mechanism.
Figure 5:
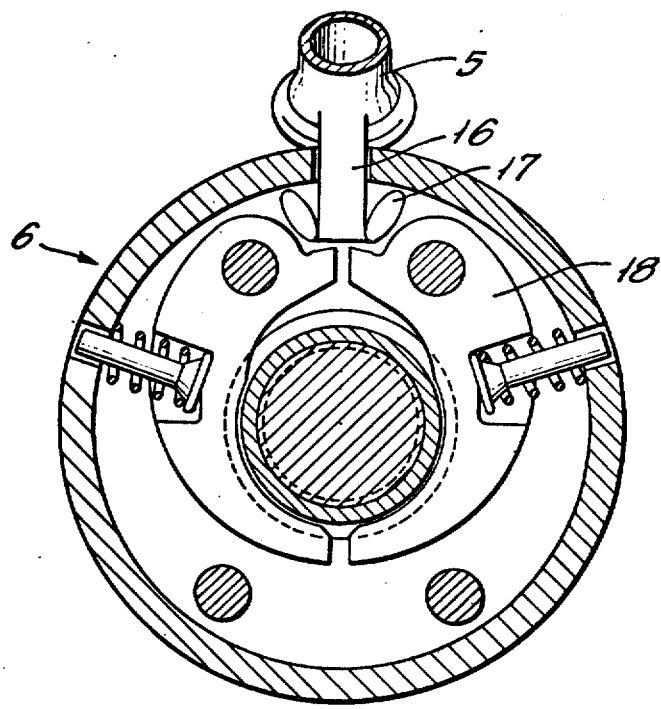
FIG. 5 is a sectional view of FIG. 4 showing the length adjusting mechanism in the closed or locked position.
Figure 6:
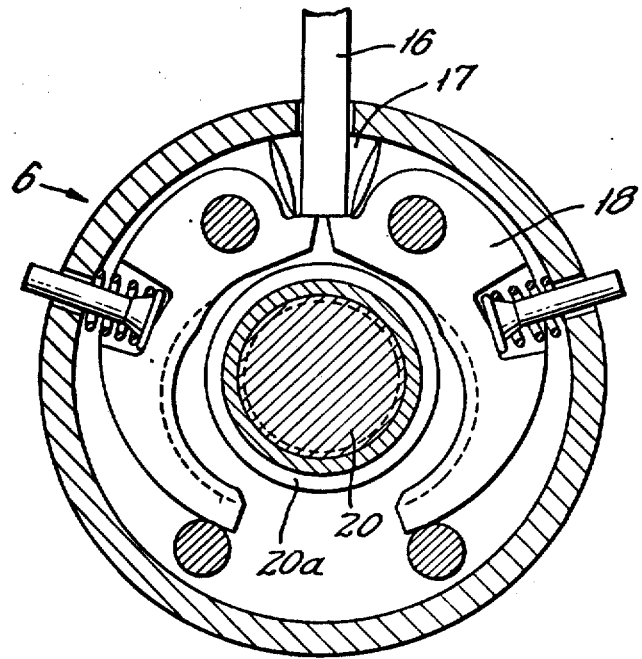
FIG. 6 is a sectional view similar to FIG. 5 but showing the length adjusting mechanism in the open or unlocked position.

The length adjusting mechanism on the upper guide member is shown in FIG. 3. The upper guide member includes an outer element 15 telescopically cooperating with an inner element having a grooved surface. The length adjusting mechanism 6 has locking jaws 18 for engaging the grooved surface of the inner element to lock the position of the inner element with respect to the outer element so that the length of the coupling member may be fixed. A cam 17 is carried within the mechanism 6 for causing the locking jaws 18 to be engaged with the grooves. A toggle-lever 16 extends into the mechanism 6 and cooperates with and acts on the cam 17 to cause release or engagement of the locking jaws. Link 5 is connected with the toggle-lever 16 so as to cause unlocking of the jaws 18 when appropriate forces are transmitted through the link to the toggle-lever 16. Note the copending application Ser. No. 779,615 of the common assignee illustrating and describing the toggle-lever 16, the cam 17 and the locking jaws 18. The illustration from the co-pending application is shown in FIGS. 4, 5 and 6 in which parts similar to those in FIGS. 1, 2 and 3 have been given the same reference numerals. In FIGS. 4, 5 and 6 cam 17 is formed on the opposite end of the toggle-lever 16 from the link 5 and has two sides. Each of a pair of the locking jaws 18 are pivotally mounted within the mechanism 6. Each jaw defines a two-armed lever having a longer arm whose inner surface is grooved so as to conform to and thus closely fit upon the grooves 20a in the inner element 20. The shorter arm of each locking jaw 18 forms an actuating portion. The actuating portions of both locking jaws 18 are positioned facing each other and are engageable by the cam 17 on the end of the toggle-lever 16. The two-sided cam 17 has one side engageable with the inner surface of the mechanism 6 and the other side engageable with the actuating portions of the jaws 18. A separate traction line 4a, note FIG. 1, is connected to the coupling frame for manually actuating the length adjusting mechanism to adjust the axial length of the upper guide member to a predetermined desired position. In manually actuating the length adjusting mechanism, the tractor operator pulls the actuating cable 4a lifting the toggle-lever 16 via link 5 so that the cam 17 having one side engaged with the inner surface of the mechanism applies a downwardly directed force toward the two actuating portions of the locking jaws 18. The jaws then pivot and the longer arms disengage from the grooves 20a of the inner element 20. When the upper guide member 4 has been adjusted in length, the tractor operator releases the actuating cable 4a and the locking jaws 18 are displaced back into locking engagement with the grooves 20a.

While the invention has been described and illustrated with respect to a certain preferred embodiment which produces satisfactory results, it will be appreciated by those skilled in the art, after understanding the purposes of the invention that various other changes and modifications may be made without departing from the spirit and scope of the invention, and it is therefore intended in the appended claims to cover all such changes and modifications.

What is claimed is:

1. A three point linkage for attaching a working machine to a vehicle comprising two lower guide members, an inverted substantially U-shaped coupling frame having a closed end and an open end formed by two legs, each of said legs being pivotally connected to one of said lower guide members, an upper guide member, tension springs supporting said upper guide member from said U-shaped coupling frame, adjusting means for longitudinally varying the length of said upper guide member, means for immobilizing said upper guide member in various extended length positions, a link connected at one end to said U-shaped coupling frame and at the other end to said length adjusting means for actuating said adjusting means upon the application of pressure to said U-shaped coupling frame, a releasable catch hook carried at one end of said upper guide member for connection to said working machine, and means for locking and unlocking said catch hook by the influence of said U-shaped frame acting thereon for causing unlocking of said catch hook upon lowering movement of said lower guide members.

2. The three point linkage according to claim 1 further comprising a traction line secured to said coupling frame for manual length adjustment of said upper guide member.

3. The three point linkage according to claim 1 wherein said upper guide member includes telescopically extendable parts and wherein said length adjusting mechanism comprises a lever connected to said link operable for releasing said telescoping parts.

4. A three point linkage for attaching a working machine to a vehicle comprising two lower guide members and an upper guide member, each of said guide members being pivotally coupled with said vehicle at one end and having releasable catch means at the other end for connection to said working machine, a coupling frame pivotally connected with said lower guide members, said coupling frame having a bridge member, tension springs connected at one end thereof to said coupling frame and at the other end thereof to said upper guide member for supporting said upper guide member beneath said bridge member, means for longitudinally adjusting the length of said upper guide member, a link connected at one end to said coupling frame and at the other end to said length adjusting means for actuating said length adjusting means upon the application of pressure to said coupling frame, said catch means on said upper guide member comprises a catch hook and locking means carried by said catch hook of said upper coupling member for opening and closing said catch hook, said locking means being moved to the open position for said catch hook by said coupling frame when said lower guide members are pivotally lowered.

5. The three point linkage according to claim 4 wherein said locking means for opening and closing said catch hook of said upper guide member comprises a locking bolt slidably carried in said upper guide member, means for urging said locking bolt into a locked position, and an extension carried by said locking bolt engageable by said bridge member of said coupling frame when said coupling frame is moved in a downward direction.

6. The three point linkage according to claim 4 wherein said upper guide member comprises telescopically cooperating parts and wherein said length adjusting means comprises a lever connected to said link operable for releasing said telescoping parts.

* * * * *

UNITED STATES PATENT OFFICE  Page 1 of 3
CERTIFICATE OF CORRECTION

Patent No. 4,149,736          Dated April 17, 1979

Inventor(s) Wilhelm Von Allwörden

It is certified that error appears in the above-identified patent and that said Letters Patent are hereby corrected as shown below:

Add Figures 4, 5 and 6. (attached)

Signed and Sealed this

Twenty-third Day of October 1979

[SEAL]

Attest:

RUTH C. MASON
Attesting Officer

LUTRELLE F. PARKER
Acting Commissioner of Patents and Trademarks